United States Patent
Lippman

(10) Patent No.: US 9,454,904 B1
(45) Date of Patent: Sep. 27, 2016

(54) SAFETY PEDAL OBSTRUCTION AND COMMAND INTENTION DETECTION

(71) Applicant: Ford Global Technologies, LLC, Dearborn, MI (US)

(72) Inventor: Mark Allan Lippman, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/658,532

(22) Filed: Mar. 16, 2015

(51) Int. Cl.
| G06F 7/70 | (2006.01) |
| G06K 9/00 | (2006.01) |
| G08G 1/16 | (2006.01) |
| B60T 7/12 | (2006.01) |
| H04N 7/18 | (2006.01) |

(52) U.S. Cl.
CPC ............... *G08G 1/161* (2013.01); *B60T 7/12* (2013.01); *H04N 7/18* (2013.01)

(58) Field of Classification Search
USPC ............................................ 701/70; 382/103
See application file for complete search history.

(56) References Cited

U.S. PATENT DOCUMENTS

| 8,340,863 | B2* | 12/2012 | Karatsinides | ......... B60K 23/00 701/36 |
| 8,744,671 | B2 | 6/2014 | Abousleiman et al. | |
| 2002/0083789 | A1* | 7/2002 | Sundaresan | ............... B60T 7/06 74/512 |
| 2002/0091479 | A1* | 7/2002 | Maruko | ................... B60T 7/22 701/96 |
| 2008/0228365 | A1* | 9/2008 | White | ................. B60K 28/063 701/70 |
| 2011/0282545 | A1* | 11/2011 | Karatsinides | ......... B60K 23/00 701/36 |
| 2012/0150387 | A1* | 6/2012 | Watson | ................ A61B 5/0077 701/36 |
| 2012/0191313 | A1 | 7/2012 | Miyahara | |
| 2012/0226423 | A1* | 9/2012 | Sekiguchi | ................ B60T 7/22 701/70 |
| 2013/0144481 | A1* | 6/2013 | Syed | .................. B60W 50/038 701/29.2 |
| 2015/0242694 | A1* | 8/2015 | Miyagawa | ............... B60R 1/00 382/103 |

FOREIGN PATENT DOCUMENTS

| CN | 101875348 A | 11/2010 | |
| EP | 1217493 A1 * | 6/2002 | ............ B60K 26/02 |
| JP | 2013151260 A | 8/2013 | |
| JP | 2012066808 A | 10/2013 | |

* cited by examiner

*Primary Examiner* — Thomas G Black
*Assistant Examiner* — Tyler Paige
(74) *Attorney, Agent, or Firm* — Frank MacKenzie; Brooks Kushman P.C.

(57) ABSTRACT

A vehicle includes a footwell object detection sensor to detect objects in the footwell. The footwell object detection sensor includes an object detection sensor and a controller. The object detection sensor outputs data indicative of a state of the footwell that includes a plurality of pedals. The controller is programmed to, in response to a difference between the data and stored data corresponding to reference states of the footwell being indicative of a presence of an object that inhibits actuation of one or more of the pedals, output a warning signal. The controller may output a pedal status of each of the pedals based on a comparison between the data and the stored data. Controller outputs can be used to confirm or invalidate pedal position signals used by other control systems in the vehicle.

19 Claims, 3 Drawing Sheets

SAFETY PEDAL OBSTRUCTION AND COMMAND INTENTION DETECTION

TECHNICAL FIELD

This application relates generally to detecting obstructed control pedals in a vehicle.

BACKGROUND

In a typical vehicle, acceleration and deceleration of the vehicle are controlled by foot pedals. A driver adjusts the amount of acceleration or deceleration by pressing on the appropriate foot pedal. The foot pedals can control acceleration and deceleration by a mechanical linkage to the braking or throttle control system. The foot pedals may include an electrical output that indicates the position of the pedal. The electrical output can be used by an electronic module to control the acceleration and deceleration of the vehicle. The foot pedals operate to indicate the driver's intent to the acceleration and deceleration control systems. However, there are situations in which the driver's intent cannot be accurately known. There are situations in which unintended objects interfere with the foot pedals. This interference inhibits the ability to provide the driver's intent to the control systems. Objects in a footwell near the foot pedals can cause unexpected operation of the vehicle. For example, an object (e.g., floor mat) may rest on a foot pedal causing a foot pedal activation that is not intended by the driver. An object may become lodged under a foot pedal causing a lack of motion of the pedal when desired by the driver.

SUMMARY

A vehicle includes a driver-side footwell including a plurality of pedals. The vehicle further includes a sensor configured to capture an image of the driver-side footwell and at least one controller programmed to, in response to a difference between the image and reference images of the footwell being indicative of a presence of an object in the footwell that inhibits actuation of one or more of the pedals, output a warning signal. The at least one controller may be further programmed to output a pedal status for each of the pedals based on a comparison between the image and the reference images.

In some configurations, the reference images may represent a plurality of captured images associated with arrangements of a driver's feet in relation to the pedals in an absence of objects in the footwell that inhibit actuation of one or more of the pedals.

In some configurations, the at least one controller may be further programmed to receive pedal position data of the pedals, and in response to a difference between the image and the reference image associated with the pedal position data being indicative of an unintended pedal application, output the warning signal.

The vehicle may further include a collision avoidance system that is configured to, in response to the warning signal, increase a distance from a target object at which to generate a collision warning indication. The collision avoidance system may be further configured to receive the pedal status and, in response to the pedal status being different than an expected pedal status, output a crash avoidance warning. The collision avoidance system may be further configured to, in response to the pedal status being different than the expected pedal status and a target object being less than a predetermined distance from the vehicle, request a brake application to reduce vehicle speed to avoid a collision with the target object.

A footwell object detection system includes a sensor configured to output data indicative of a state of a driver-side footwell that includes a plurality of pedals and at least one controller programmed to, in response to a difference between the data and stored data corresponding to reference states of the footwell being indicative of a presence of an object that inhibits actuation of one or more of the pedals, output a warning signal. The output data of the sensor may be an image. The reference states may represent a plurality of states associated with arrangements of a driver's feet in relation to the pedals in an absence of objects in the footwell that inhibit actuation of one or more of the pedals. The at least one controller may be further programmed to output a pedal status for each of the pedals based on a comparison between the data and the stored data.

The sensor may be a digital camera, a video camera, a laser-based sensor, a radar sensor, a sonar sensor, or a night-vision camera. The warning signal may be one or more of an audible alarm, a visual indicator, and a tactile indicator.

A method for detecting objects in a driver-side footwell of a vehicle includes capturing, by at least one controller, an image of the footwell including a plurality of pedals. The method further includes outputting, by the at least one controller, a warning indication in response to a difference between the image and reference images of the footwell being indicative of a presence of an object that inhibits actuation of one or more of the pedals. The method may further include increasing, by the at least one controller, a distance from a target object at which a collision avoidance system applies brakes to reduce vehicle speed. The method may further include increasing, by the at least one controller, a distance from a target object at which a collision avoidance system generates a collision warning indication. The method may further include outputting, by the at least one controller, a pedal status for each of the pedals based on a comparison between the image and the reference images. The method may further include outputting, by the at least one controller, the warning indication in response to a difference between the image and the reference image associated with vehicle acceleration data being indicative of an unintended pedal application.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1A:
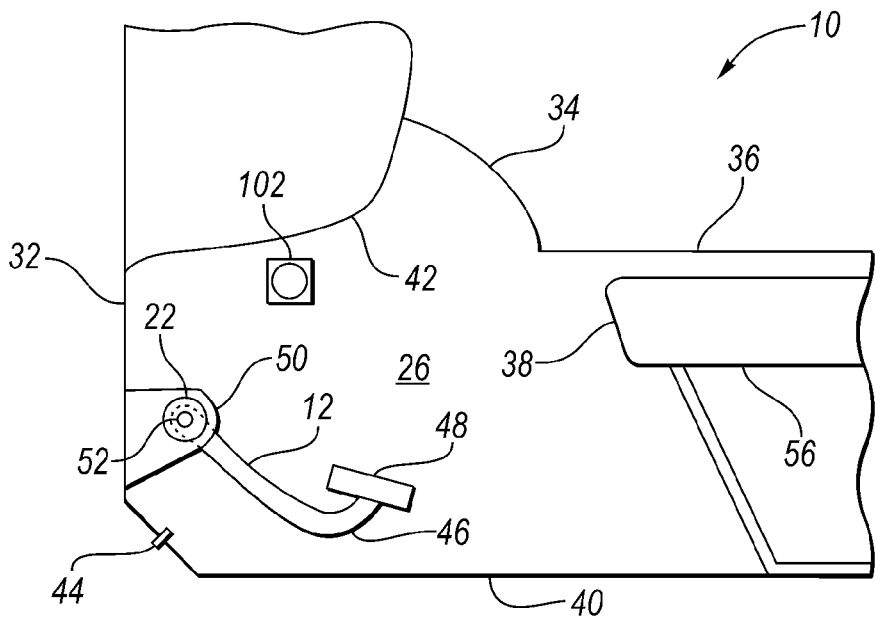
FIG. 1A is a possible side view of a driver-side footwell.
Figure 1B:
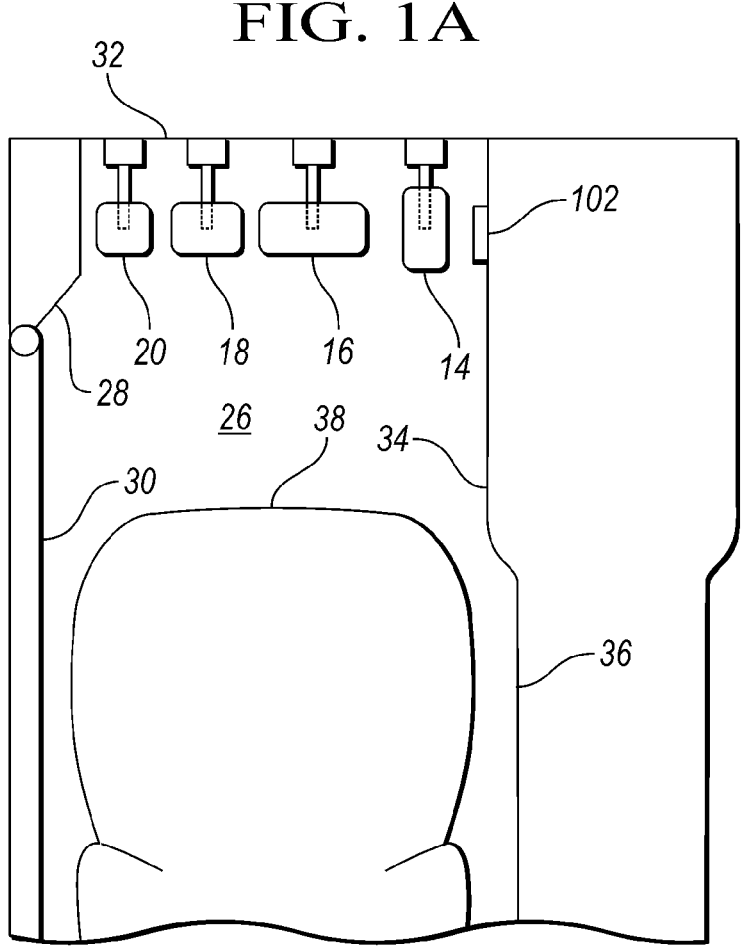
FIG. 1B is a possible top view of a driver-side footwell.

FIG. 1A depicts a possible side view of a driver-side footwell 26 of a vehicle 10. FIG. 1B depicts a possible top view of the driver-side footwell 26 of the vehicle 10. Within the footwell 26 may be mounted several lever style pedal assemblies 12 configured to be depressed to actuate and control one or more of throttle, brake and clutch functions. The vehicle 10 may include an accelerator pedal 14 that is configured to adjust a throttle mechanism to control an amount of acceleration of the vehicle 10. The vehicle 10 may include a brake pedal 16 that is configured to adjust an amount of brake pressure to control an amount of deceleration of the vehicle 10. The vehicle 10 may include a clutch pedal 18 that is configured to disengage a transmission from an engine to permit changing a gear of the transmission. The vehicle 10 may include a parking brake pedal 20 that is configured to activate a parking brake. The vehicle 10 having an automatic transmission may include the accelerator pedal 14 and the brake pedal 16. The vehicle 10 having a manual transmission may include the accelerator pedal 14, the brake pedal 16, and the clutch pedal 18. FIGS. 1A and 1B depict a left-side driver's footwell 26, but the disclosure also covers a right-side driver's footwell 26 with the component position adjusted accordingly.

The pedal assembly 12 may be located in the footwell 26 of the vehicle 10 and may be configured to be operated by a driver's feet. The footwell 26 may be defined by a space that includes the pedal assemblies 12 and that space surrounding the pedal assemblies. In a horizontal plane, the footwell 26 may include the space bounded by a driver's side panel 28 and door 30, a firewall 32, a central tunnel sidewall 36 and/or a center console sidewall 34, and a front of a driver's seat 38. In a vertical dimension, the footwell 26 may include the space between a floor pan 40 of the vehicle 10 and an underside of a dashboard 42 of the vehicle 10. The firewall 32 (or bulkhead) may be defined as a structure or panel that separates an engine compartment from a passenger compartment of the vehicle 10. The floor pan 40 of the vehicle 10 may be defined as a structural component or panel that separates the passenger compartment from an underside of the vehicle 10. The firewall 32 and floor pan 40 may be fastened (e.g, welded, bolted, riveted) together along a seam 44 that may define a boundary between the two. The footwell 26 may be further defined as a region encompassed by those surfaces contained within a volume defined by maximum dimensions in each coordinate of the horizontal plane and a maximum value of the vertical dimension. More generally, the footwell 26 may include that space in the vicinity of the pedals 14, 16, 18, 20 in which the driver's feet may be placed during operation of the vehicle 10.

The pedal assembly 12 may include an arm 46 and a foot pad 48. The foot pad 48 may be configured such that the driver's foot may be placed on the pad 48 to apply a force. Each pedal may have a different shape foot pad 48. The arm 46 may be pivotally coupled to a mounting bracket 50 that is coupled to the firewall 32 or floor pan 40. When a force is applied to the foot pad 48, the pedal 12 may pivot about a pivot point 52 of the arm 46. The pedal assembly 12 may be mechanically linked to associated mechanical systems via mechanical linkages and actuation of the associated mechanical system may be effected depression of the pedal 12.

The pedal assembly 12 may be configured to be biased to a default or deactivated position. The mechanism for biasing the pedal assembly 12 to the default position may include a torsion spring at the pivot point 52 or other damping mechanism attached between the arm 46 and the firewall 32 or floor pan 40. The bias mechanism may be configured to provide resistance to an actuating motion of the pedal 12 (e.g., a pedal depression). In some configurations, mechanical linkages to actuate associated functions may provide this resistance to motion. For example, a brake pedal motion may be resisted by force required to build pressure within the brake system. The pedal assembly 12 may include an electrical sensor 22 that provides a signal 54 that varies with a position of the pedal 12. The electrical sensor 22 may be a potentiometer coupled at the pivot point 52 of the arm 46 in which a resistance varies as the arm 46 rotates about the pivot point 52.

The electrical sensor 22 may be electrically coupled to a controller to permit detection of a position or relative angle of rotation of the pedal 12. The pedal position may be used by the controller to control vehicle operations such as acceleration and deceleration. A drawback of lever style pedal assembly 12 is that an object may enter the travel path of the pedal assembly 12. For example, an object that comes to rest between the arm 46 or footpad 48 and the floor pan 40 may obstruct motion of the pedal 12. The object may prevent motion of the pedal 12 to a position intended by the driver leading to a loss of control for the driver. That is, the pedal 12 does not effect a control action that the driver intends. For example, an object may obstruct the downward movement of the brake pedal 16. If the brake pedal 16 is obstructed, vehicle deceleration may be less than the driver intends.

Figure 2:
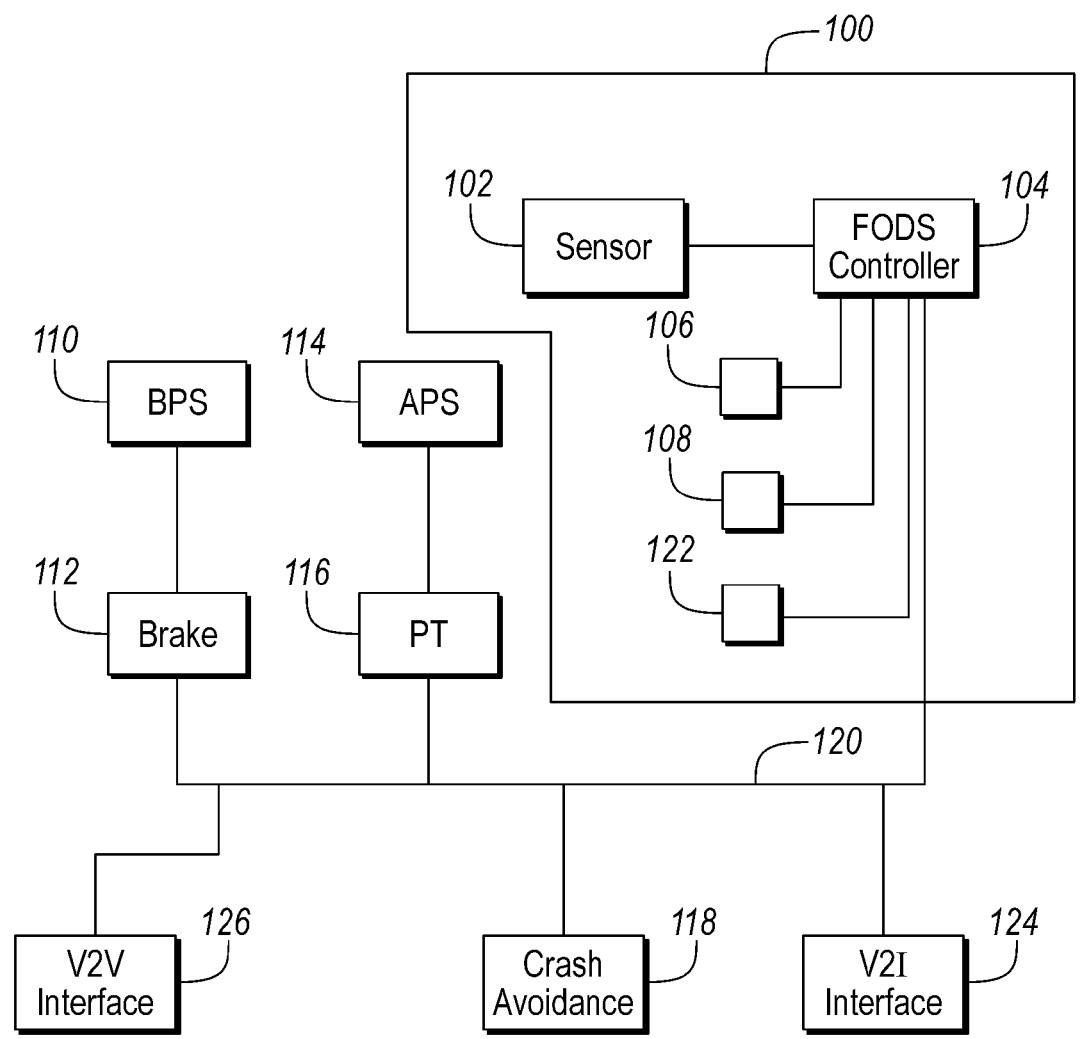
FIG. 2 is a possible configuration of control modules in a vehicle including a driver-side footwell object detection system.

FIG. 2 depicts a possible configuration of controllers and sensors to implement a footwell object detection system (FODS) 100. The vehicle 10 may include the footwell object detection system 100 to monitor the footwell 26 for unintended objects that may interfere with pedal operation. A pedal interference may include preventing the driver from positioning the pedal 12 to the intended position (e.g., obstructing movement of the pedal). An obstructing object may cause a reduced pedal reaction leading to a control action that is less than the driver's intent, such as reduced braking or acceleration. Another pedal interference may include positioning the pedal 12 to an actuated position without driver interaction (e.g., unintended force applied to the pedal). The interference to pedal operation without driver interaction may cause unintended control actions, such as unintended braking or acceleration.

The footwell object detection system 100 may include one or more object detection sensors 102 located in the footwell 26 of the vehicle 10 to detect objects that may impede the movement or cause movement of one or more of the pedals 12. The object detection sensor 102 may include a photo optic type sensor such as a laser sensor or an image recognition type sensor such as a camera. The object detection sensor 102 may include infrared capability to achieve vision in low-light conditions. The object detection sensor 102 may be a digital camera, a video camera, a laser-based sensor, a radar sensor, a sonar sensor, or a night-vision camera. An output of the object detection sensor 102 may be an image of the footwell 26. The object detection sensor 102 may be configured to provide two-dimensional images. In some configurations, the object detection sensor 102 may be configured to provide three-dimensional image data using multiple sensors.

The footwell object detection system 100 may include one or more FODS controllers 104 that interface with the object detection sensor 102. The FODS controller 104 may include a processor to execute instructions and programs. The FODS controller 104 may further include volatile and non-volatile memory to store data and instructions. The FODS controller 104 may further include interface circuitry to interface with the object detection sensor 102. The interface circuitry may include analog-to-digital converters and filters. The FODS controller 104 may include one or more serial interfaces 120 for communicating with additional controllers in the vehicle 10. The serial interface 120 may be a Controller Area Network (CAN) interface. The FODS controller 104 may include a network interface defined by Institute of Electrical and Electronics Engineers (IEEE) 802 family of standards. The FODS controller 104 may include software drivers for communicating via the serial and network interfaces.

A brake system controller 112 may be electrically coupled to a brake pedal sensor 110 that is mechanically coupled to the brake pedal 16. The brake pedal sensor 110 may provide a signal indicative of a position or angle of rotation of the brake pedal 16. A powertrain controller 116 may be electrically coupled to an accelerator pedal sensor 114 that is mechanically coupled to the accelerator pedal 14. The accelerator pedal sensor may provide a signal indicative of a position or angle of rotation of the accelerator pedal 14. A Collision Avoidance System (CAS) 118 may include one or more controllers that communicate with the other controllers 104, 112, 116 over the serial communications bus 120. The FODS controller 104 may exchange data with the brake controller 112, the powertrain controller 116, and the CAS 118.

The object detection sensor 102 may be mounted in a location within the passenger cabin to monitor the footwell 26 for objects. The object detection sensor 102 may be located within the footwell 26. For example, the object detection sensor 102 may be mounted to the central console sidewall 34 or the driver's side panel 28. In some configurations, the object detection sensor 102 may be mounted on the firewall 32. In some configurations, the object detection sensor 102 may be mounted in a space between an underside of the driver's seat 56 and the floor pan 40. The object detection sensor 102 may be mounted in a position such that the sensor 102 may collect data representing the entire footwell 26. Some configurations may include multiple object detection sensors 102 mounted in different locations to improve detection. Considerations for the mounting location of the object detection sensor 102 may include maximizing sensor view of the footwell 26, minimizing obstructed views, and reducing sensor blockages.

Under normal conditions, the only objects expected in the footwell 26 are legs and feet of the driver. As such, the footwell object detection system 100 may be configured to recognize that an object in the footwell 26 is one or both of the driver's legs and feet. The system 100 may be further configured to detect additional objects that may interfere with normal pedal operation. Such objects may include floor mats or rugs that may have rolled up near the pedal 12 or have otherwise changed shape in manner that may affect operation of the pedal 12. The objects may include any of a variety of loose items that may be on the floor of the vehicle. For example, the object may be a ball or other round object, a can, a bottle, a box or package, or a catalog or book. Any object carried in the vehicle 10 may potentially end up in the footwell 26.

The footwell object detection system 100 may include an audible indicator 106 that may be used to alert the driver of objects in the footwell 26. The audible indicator 106 may be a buzzer, a speaker, a bell, a chime, or other audible sound generator. The footwell object detection system 100 may include a visual indicator 108 that may be used to alert the driver of objects in the footwell 26. The visual indicator 108 may be a lamp, a light, a display, or other visual indication. The visual indicator 108 may be mounted in a location that is easily visible to the driver. The footwell object detection system 100 may include a tactile indicator 122 that may be used to alert the driver. The tactile indicator 122 may include an electric motor that rotates an unbalanced weight. For example, a tactile indicator 122 may be coupled to the steering wheel or the pedal 12 to cause vibration in response to the alert. The audible indicator 106, the visual indicator 108, and the tactile indicator 122 may be interfaced to the controller 104 by discrete wires or serial communication. The audible indicator 106, the visual indicator 108, and the tactile indicator 122 may be electrically coupled to the FODS controller 104. In some configurations, the audible indicator 106, the visual indicator 108, and the tactile indicator 122 may be controlled via the serial communications bus.

The object detection sensor 102 may output data indicative of a present state of the driver side footwell 26. For example, the present state may be represented by an image or radar/sonar map of the footwell 26. The object detection sensor 102 may be configured to capture an image of the footwell 26. The object detection sensor 102 may process raw sensor data. For example, an image sensor may implement an edge-detection algorithm or other types of filters to better highlight objects and shapes in the footwell 26. The output may be an image or an image pattern that represents the present state of the footwell 26.

The FODS controller 104 may store data in memory that is indicative of reference states of the footwell 26 and pedals 12. The reference states may be images. The stored data may correspond to output data of the object detection sensor 102 during normal operating conditions. The reference states may include expected operating conditions without unintended objects in the footwell 26. The stored data may be generated during development by recording output data of the object detection sensor 102 during various reference conditions. The reference states may include predicted sensor output data for the footwell 26 prior to driver entry. The reference states may include conditions in which the driver's legs and feet are positioned to operate the vehicle. For example, reference states may include an accelerator pedal application, a brake pedal application, and a clutch pedal application. The reference states may include various resting positions for the driver's feet. The reference states may include driving arrangements in which both feet are on the pedals. The reference states may represent a plurality of states associated with arrangements of the driver's feet in relation to the pedals in an absence of object in the footwell 26 that inhibit actuation of one or more of the pedals 12.

The footwell object detection system 100 may be calibrated by training the system to recognize patterns present during normal operating conditions. During a training period, the FODS controller 104 may monitor signals from the object detection sensor 102 under different conditions to determine reference images and patterns. For example, the FODS controller 104 may process the sensor data during pedal activations and store the image and pattern data in non-volatile memory for later retrieval. The FODS controller 104 may process the sensor data for patterns representing the legs and feet of the driver. A normal driving pattern or reference state may be identified. For example, patterns may be stored during activation of the accelerator pedal and during activation of the brake pedal 16. The training period may be a fixed period time corresponding to sale of the vehicle 10. In some configurations, the training period may be continuous such that the reference states may be continually updated over time. Continual updating of the reference states may improve performance as the reference states may become tuned to each driver.

The stored data may be processed offline and stored in the memory of the FODS controller 104. The reference data may represent images of the footwell 26. The reference data may be pre-processed to identify shapes and patterns that are present in the images of the footwell 26 during normal operation. The offline processing may include processing the reference data using pattern and shape recognition algorithms. The stored data may also include associated parameters identifying the condition. Parameters may include data indicative of the pedals that are applied. Patterns representing the shapes may be stored in the memory of the FODS controller 104. The offline processing may include operations that are similar to processing by the FODS controller 104 during vehicle operation.

The stored data may represent a database of expected outputs of the object detection sensor 102 during normal operation. During vehicle operation, the FODS controller 104 may receive and process the data from the object detection sensor 102. The data representing the present state may be compared to the stored data representing the reference states. The present state may be compared with each reference state until a match is detected. If the data is not recognized within the stored data, then there may be an object present in the footwell 26. In some configurations, the stored data may include objects that impede the motion of one or more of the pedals 12.

The processing by the FODS controller 104 may include shape identification. The shapes identified in the present state sensor data may be compared to those shapes in the stored memory. For example, a shape may be recognized as the driver's foot. The data may be processed to account for different sizes of the shapes. The FODS controller 104 may execute pattern recognition algorithms to identify patterns in the data. For example, the stored data may represent an average sized foot. The present data may differ due to the driver's foot being larger or smaller. The FODS controller 104 may be configured to scale and realign shapes and patterns to facilitate comparison of the stored data and the present sensor data.

During vehicle operation, objects may move into and out of the footwell 26. For example, the object may move as the vehicle 10 accelerates and decelerates. The FODS controller 104 may periodically sample sensor data from the object detection sensor 102. The footwell object detection system 100 may be configured to track the movement of objects into and out of the footwell 26 area. The FODS controller 104 may be configured to compare consecutive images to identify changes between the images. Differences in the images between sample times may indicate movement of objects in the footwell 26. The FODS controller 104 may activate a warning indicator if an object is sensed moving into and out of the footwell 26 area to alert the driver of the condition.

The footwell object detection system 100 may be configured to operate in the lighting conditions that are present in the footwell 26. The footwell object detection system 100 may be configured to operate in low light conditions as may be present at night. Although internal lighting may illuminate the footwell 26, there may be situations in which the lighting is blocked or non-functional. The object detection sensor 102 may be a camera with night-vision capability to operate in low-light conditions. Infrared, radar, and/or sonar sensor may be utilized to improve low-light capability.

The footwell object detection system 100 may be configured to monitor the footwell 26 during ignition on conditions. That is, the footwell object detection system 100 may be operable while the vehicle is in operation. The footwell object detection system 100 may continually monitor the state of the footwell 26 even when the pedals are not actuated. In this manner, the footwell object detection system 100 may detect movement of the driver's feet as well as the movement of objects that may be within the footwell 26. As such, the footwell object detection system 100 can provide more than just a confirmation of an applied pedal. The footwell object detection system 100 may be capable of determining a driver's intended application of the pedals 12 without relying on the electrical sensor 22 associated with the pedal 12.

The footwell object detection system 100 may be configured to detect when unintended objects are in the driver-side footwell 26. The FODS controller 104 may receive data representing a present state of the footwell 26. The data may be an image of the footwell 26. The FODS controller 104 may compare the present to reference states of the footwell 26. The reference states may be images of the footwell 26 that are stored in memory. Using standard image processing algorithms, the FODS controller 104 may compare the image to the reference images. In response to a difference between the image and reference images of the footwell being indicative of a presence of an object in the footwell that inhibits actuation of one or more of the pedals, the FODS controller 104 may output a warning signal to activate the audible indicator 106, the visible indicator 108, and/or the tactile indicator 122.

In some configurations, the footwell object detection system 100 may be configured to determine if the sensor signals from the pedal corresponds to the pedal that the driver is actuating. That is, the electrical signal associated with the pedal indicates movement of the pedal when the present state indicates that the pedal is being actuated. As an example, an object that is preventing a pedal 12 from being released back to the default position may be detected. Data from the object detection sensor 102 may be indicative of the leg and foot of the driver being away from the pedals 12. In such a condition, data indicative of a pedal activation based on pedal data does not match the data from the object detection sensor 102. In such a condition, the FODS controller 104 may activate the audible and/or visible indicator.

In addition to outputting a warning, the FODS controller 104 may output a signal indicative of a status of each of the pedals 12. Status information may be output for each of the pedals 12 in the footwell 26. The status information may include a predicted state based on a comparison of the image data to the reference or stored data. The status information may include an application state (e.g., actuated, not actuated) of each pedal 12. The status information for each pedal may include an indicator that the driver's feet are located in the vicinity of the pedal (e.g., actuation imminent, actuation just released). The status information may include an indication that the driver's feet are moving (e.g., from the accelerator pedal 14 to the brake pedal 16). If the electrical signal data indicates an actuation and the image data corresponds to an actuation by the driver, then the status information may include a confirmed or validated indication. If the electrical signal data indicates an actuation and the image data does not correspond to an actuation by the driver, then the status information may be set to indicate an unintended actuation. If the electrical signal data indicates no actuation by the driver and the image data corresponds to actuation by the driver, then the status information may be set to indicate an obstruction. If the image data does not match the reference images, then the status information may be set to indicate that an obstruction is suspected. The pedal status may be communicated to other controllers 110, 114, 118. The other controllers 110, 114, 118 may utilize to pedal status to modify operation that is based on the pedals.

The footwell object detection system 100 may also be utilized to determine that the vehicle is responding properly to driver commands. Vehicle feedback signals may be monitored to detect situations in which the pedals are being actuated by forces other than the driver. Vehicle acceleration data may be received by the FODS controller 104. The vehicle acceleration data may provide information for acceleration and deceleration of the vehicle 10. The vehicle acceleration data may be cross-checked with the image data to determine if the vehicle performance matches driver intent. For example, the vehicle acceleration data may indicate that the vehicle is accelerating above a threshold. The vehicle performance or response may be indicative of the driver actuating the accelerator pedal 14. The FODS controller 104 may compare the present image data to the reference image data to determine the type of pedal application. If the present image data is indicative of the accelerator pedal application, then the vehicle behavior and the driver behavior match. If the present image data is indicative of a different pedal application or no pedal application, then there is a possibility of an unintended object (e.g., floor mat) actuating the accelerator pedal 14. The FODS controller 104 may output a warning indicator. The FODS controller 104 may output a pedal status indicator that includes states of operation confirmed, pedal obstructed, and unintentional application. The powertrain controller may receive the warning and pedal status and limit the response to the accelerator pedal signal. Other pedals in the footwell 26 may be monitored in a similar manner.

The CAS 118 may implement various features to avoid accidents. The CAS 118 may include an Adaptive Cruise Control (ACC)/Collision Warning (CW) system that utilizes a radar system to detect objects in the path of the vehicle. The ACC/CW system may be configured to maintain a vehicle speed at a selected speed when activated. The ACC/CW system may be configured to apply the brakes to decelerate the vehicle. The ACC/CW system may be configured to apply the brakes to bring the vehicle 10 to a complete stop under certain conditions. The ACC/CW system may cause a brake application by communicating a braking request to the brake controller 112. The brake controller 112 may control the brake system to apply the requested brake pressure.

During cruise control operation, the legs and feet of the driver may be placed in an area away from the pedals (e.g., a rest position). The ACC/CW system may deactivate cruise control mode when the driver presses on the brake pedal 16. The ACC/CW system may override the cruise control acceleration command when the driver presses on the accelerator pedal 14. The footwell object detection system 100 may be used to ensure that the state of brake pedal 16 and accelerator pedal 14 used by the ACC/CW system 118 are correct.

The FODS controller 104 may monitor data from the object detection sensor 102 and the brake pedal position sensor 110 and the acceleration pedal position sensor 114. During cruise control mode the FODS controller 104 may monitor the accelerator pedal position sensor 114 and determine if the signal from the accelerator pedal position sensor 114 is indicative of an actuation of the accelerator pedal 14. If the signal is indicative of an accelerator pedal 14 application, the FODS controller 104 may compare data from the object detection sensor 102 with stored data corresponding to the driver applying the accelerator pedal 14. If the data matches, the acceleration pedal 14 application may be confirmed. If the data does not match, then an unintended pedal application may be suspected. The FODS controller 104 may transmit the status to the CAS 118. In response to the status indicating an unintended pedal application, the CAS 118 may ignore the apparently false acceleration request from the accelerator pedal position sensor 114.

The FODS controller 104 may monitor the brake pedal position sensor 110. The FODS controller 104 may compare data from the object detection sensor 102 with stored data corresponding to the driver applying the brake pedal 16. The FODS controller 104 may indicate an obstructed status for the brake pedal 16 if the brake pedal position sensor 110 and the image data do not provide the same status (e.g., brake applied or brake not applied).

The CAS 118 may include a vehicle-to-vehicle (V2V) communication interface 126 and a vehicle-to-infrastructure (V2I) communication interface 124 that provides an indication of objects in a path of the vehicle 10. For example, the V2I communication interface 124 may receive information such as the status of upcoming traffic lights, stop signs, or traffic density. The V2V communications interface 126 may receive information regarding the status of nearby vehicles such as speed, acceleration, and brake application. The CAS 118 may alert the driver of objects in the path of the vehicle 10. The CAS 118 may be configured to activate the braking system to stop the vehicle 10 in the event of an imminent collision.

When the presence of an object is detected that may impede movement of the pedals 12, thresholds associated with the collision warning function may be reduced. The CAS 118 may be configured to automatically apply the brakes earlier than normal. This allows the vehicle 10 to stop in a shorter distance than otherwise possible due to the object impeding the pedal 12.

For example, an object may impede downward movement of the brake pedal 16. During such an event, the driver may only be able to activate the brake pedal 16 to a certain level which may not be an amount of braking that the driver desires. A conventional ACC/CW system may recognize that the driver is applying the brake pedal 16 and inhibit automatic brake activation. The improved collision warning function may receive the information regarding an object in the footwell 26 that may be impeding the movement of the brake pedal 16. In response to this information, the CAS 118 may automatically apply the brakes to provide a level of deceleration to prevent a collision even in the presence of brake pedal movement.

The collision warning thresholds that are reduced may be those thresholds that relate to detection of objects in the path of the vehicle 10. The collision warning function may be configured to increase a distance from a target object at which to generate a collision warning indication. This may permit earlier notification to the driver of potential object in the path of the vehicle 10. This allows the driver more time to respond to the collision alert. With the extra time, the driver may be able to move the obstruction from the pedal area. The CAS 118 may also be configured to increase a distance from the target object at which a collision warning system applies brakes to reduce vehicle speed. This may allow the CAS 118 to compensate for an object that impedes the movement of the brake pedal 16.

The CAS 118 may be configured to inhibit automatic brake activation when the driver's foot is on the brake pedal 16. When an object is detected in the footwell 26, the CAS 118 may be configured to permit automatic brake activation, regardless of the presence of the driver's foot on the brake pedal 16. This feature permits automatic braking in response to an object detected in the footwell 26 that may interfere with driver braking.

Figure 3:
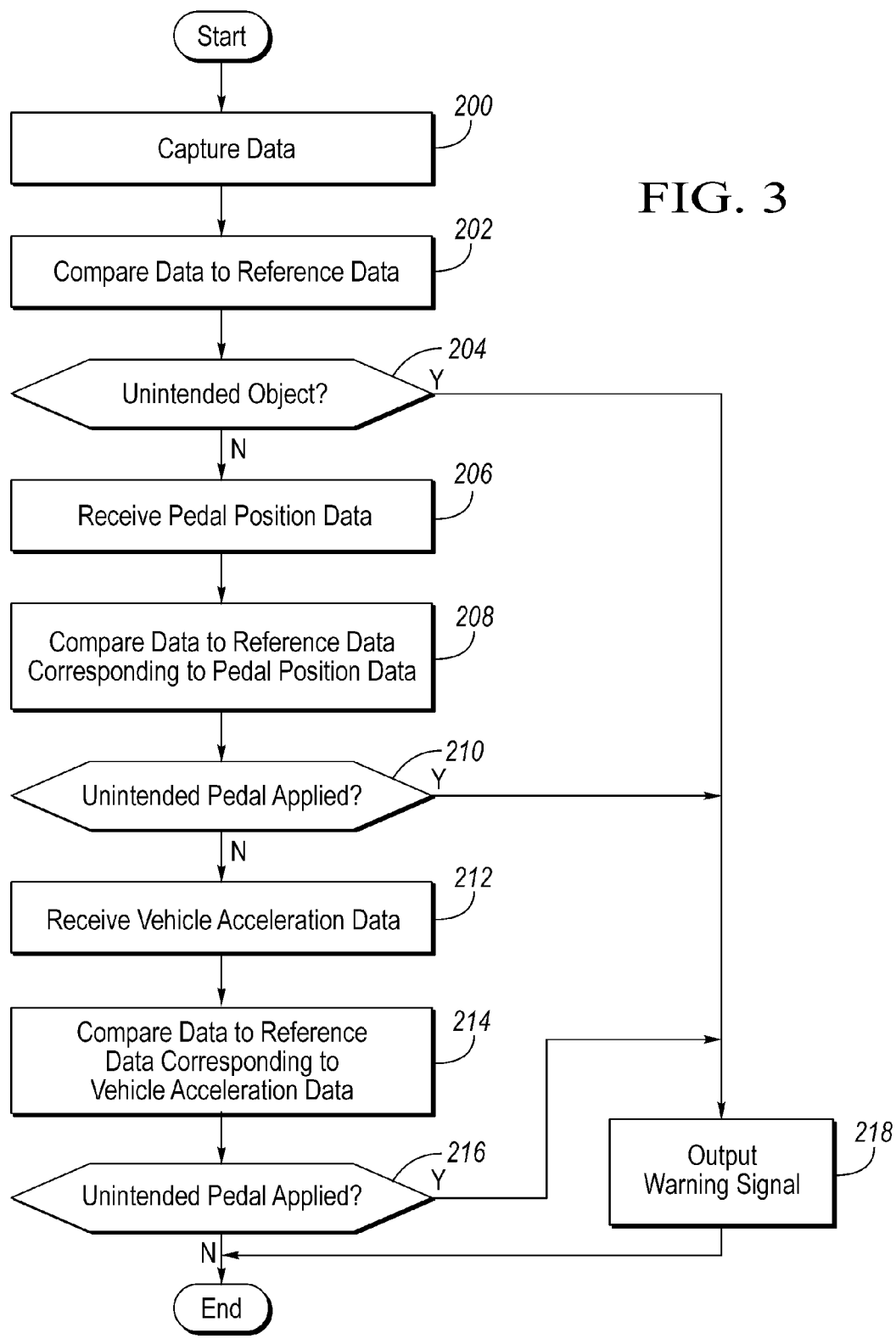
FIG. 3 is a possible sequence of operations for a outputting a warning signal for a driver-side footwell object detection system.

FIG. 3 depicts a flow chart of a possible sequence of operations that may be implemented in the FODS controller 104 to generate and output the warning signal. At operation 200, data representing the present state of the footwell 26 is captured. At step 202, the data is compared to reference data to detect any unintended objects in the footwell 26. At operation 204, the execution sequence may be changed if an unintended object is detected. If the comparison results in the detection of an unintended object, then execution may transfer to operation 218. At operation 218, a warning signal is output. The warning signal may activate the audible indicator 106 and/or the visible indicator 108.

If the comparison of operation 202 results in no unintended objects being detected, operation 204 may transfer execution to operation 206. At operation 206, pedal position data may be received. At operation 208, the data representing the present state is compared to the reference data corresponding to the pedal position data. At operation 210, the execution sequence may be changed if an unintended pedal application is detected. If an unintended pedal application is detected, execution is transferred to operation 218 which generate the output warning signal.

If the comparison of operation 208 does not result in an unintended pedal application being detected, then execution may transfer to operation 212. At operation 212, vehicle acceleration data may be received. At operation 214, the data representing the present state is compared to the reference data corresponding to the vehicle acceleration data. At operation 216, the execution sequence may be changed if an unintended pedal application is detected. If an unintended pedal application is detected, execution is transferred to operation 218 which generate the output warning signal. In some configurations, the sequence of operations may be altered. A result of the comparison operations may also include a determination of the pedal status. In some configurations, an additional operation of outputting the pedal status may be included.

Other control modules in the vehicle 10 may receive the warning signal and pedal status and perform operations based on these signals. The operations may include inhibiting functions as well as altering control actions. The operations may include automatic actuation of various control functions such as braking.

In some configurations, the footwell object detection system 100 may be used to enhance the CAS 118 functions. The CAS 118 may determine an expected control action that should be taken (e.g., braking, acceleration, steering). The footwell object detection system 100 may provide information about whether the driver's control actions are consistent with the expected control action. The footwell object detection system 100 may output the pedal status for each of the pedals 12 as described. The CAS 118 may compare the pedal status to an expected pedal status. For example, the vehicle may be approaching a red light in which the driver may be expected to brake (e.g., expected pedal status is brake pedal applied). The vehicle 10 may receive information about the red light condition from the V2I interface 124. The FODS controller 104 may compare the present state of the footwell 26 to the reference states to determine the pedal status for each of the pedals 12. If the pedal status does not match the expected pedal status, the CAS 118 may issue a warning and initiate a corrective action. The corrective action may be to request a brake application to stop the vehicle 10.

As another example, the vehicle 10 may be stopped at the red light. The red light may change to a green light. The status of the traffic light may be received from the V2I interface 124. Further, information regarding nearby vehicles may be received by the V2V interface 126. The CAS 118 may conclude that the vehicle 10 should accelerate in response to the green light (e.g., expected pedal status is accelerator pedal applied). The FODS controller 104 may again compare the present state of the footwell 26 to the references states to determine the pedal status. If the pedal status does not match the expected pedal status then the CAS 118 may issue a warning signal.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a driver-side footwell including a plurality of pedals;
a sensor configured to capture an image of the driver-side footwell; and
at least one controller programmed to, in response to a difference between the image and reference images of the footwell being indicative of a presence of an object in the footwell that inhibits actuation of one or more of the pedals, output a warning signal.

2. The vehicle of claim 1 wherein the reference images represent a plurality of captured images associated with arrangements of a driver's feet in relation to the pedals in an absence of objects in the footwell that inhibit actuation of one or more of the pedals.

3. The vehicle of claim 1 wherein the sensor is a digital camera, a video camera, a laser-based sensor, a radar sensor, a sonar sensor, or a night-vision camera.

4. The vehicle of claim 1 wherein the warning signal is one or more of an audible alarm, a visual indicator and a tactile indicator.

5. The vehicle of claim 1 wherein the at least one controller is further programmed to receive pedal position data of the pedals, and in response to a difference between the image and the reference image associated with the pedal position data being indicative of an unintended pedal application, output the warning signal.

6. The vehicle of claim 1 wherein the at least one controller is further programmed to output a pedal status for each of the pedals based on a comparison between the image and the reference images.

7. The vehicle of claim 6 further comprising a collision avoidance system that is configured to receive the pedal status and, in response to the pedal status being different than an expected pedal status, output a crash avoidance warning.

8. The vehicle of claim 7 wherein the collision avoidance system is further configured to, in response to the pedal status being different than the expected pedal status and a target object being less than a predetermined distance from the vehicle, request a brake application to reduce vehicle speed to avoid a collision with the target object.

9. The vehicle of claim 1 further comprising a collision avoidance system that is configured to, in response to the warning signal, increase a distance from a target object at which to generate a collision warning indication.

10. A footwell object detection system comprising:
a sensor configured to output image data indicative of a state of a driver-side footwell that includes a plurality of pedals; and
at least one controller programmed to, in response to differences between the image data and stored image data corresponding to reference states of the footwell being indicative of a presence of an object that inhibits actuation of one or more of the pedals, output a warning signal.

11. The footwell object detection system of claim 10 wherein the sensor is a digital camera, a video camera, a laser-based sensor, a radar sensor, a sonar sensor, or a night-vision camera.

12. The footwell object detection system of claim 10 wherein the warning signal is one or more of an audible alarm, a visual indicator, and a tactile indicator.

13. The footwell object detection system of claim 10 wherein the stored image data corresponds to reference states that represent a plurality of states associated with arrangements of a driver's feet in relation to the pedals in an absence of objects in the footwell that inhibit actuation of one or more of the pedals.

14. The footwell object detection system of claim 10 wherein the at least one controller is further programmed to output a pedal status for each of the pedals based on a comparison between the image data and the stored image data.

15. A method for detecting objects in a driver-side footwell of a vehicle, the method comprising:
capturing, by at least one controller, an image of the footwell including a plurality of pedals; and
outputting, by the at least one controller, a warning indication in response to a difference between the image and reference images of the footwell being indicative of a presence of an object that inhibits actuation of one or more of the pedals.

16. The method of claim 15 further comprising increasing, by the at least one controller, a distance from a target object at which a collision avoidance system applies brakes to reduce vehicle speed.

17. The method of claim 15 further comprising increasing, by the at least one controller, a distance from a target object at which a collision avoidance system generates a collision warning indication.

18. The method of claim 15 further comprising outputting, by the at least one controller, a pedal status for each of the pedals based on a comparison between the image and the reference images.

19. The method of claim 15 further comprising outputting, by the at least one controller, the warning indication in response to a difference between the image and the reference image associated with vehicle acceleration data being indicative of an unintended pedal application.

* * * * *